Dec. 7, 1937.   E. A. THOMPSON   2,101,827
SYNCHRONIZED POWER TRANSMISSION MECHANISM
Filed Aug. 27, 1928
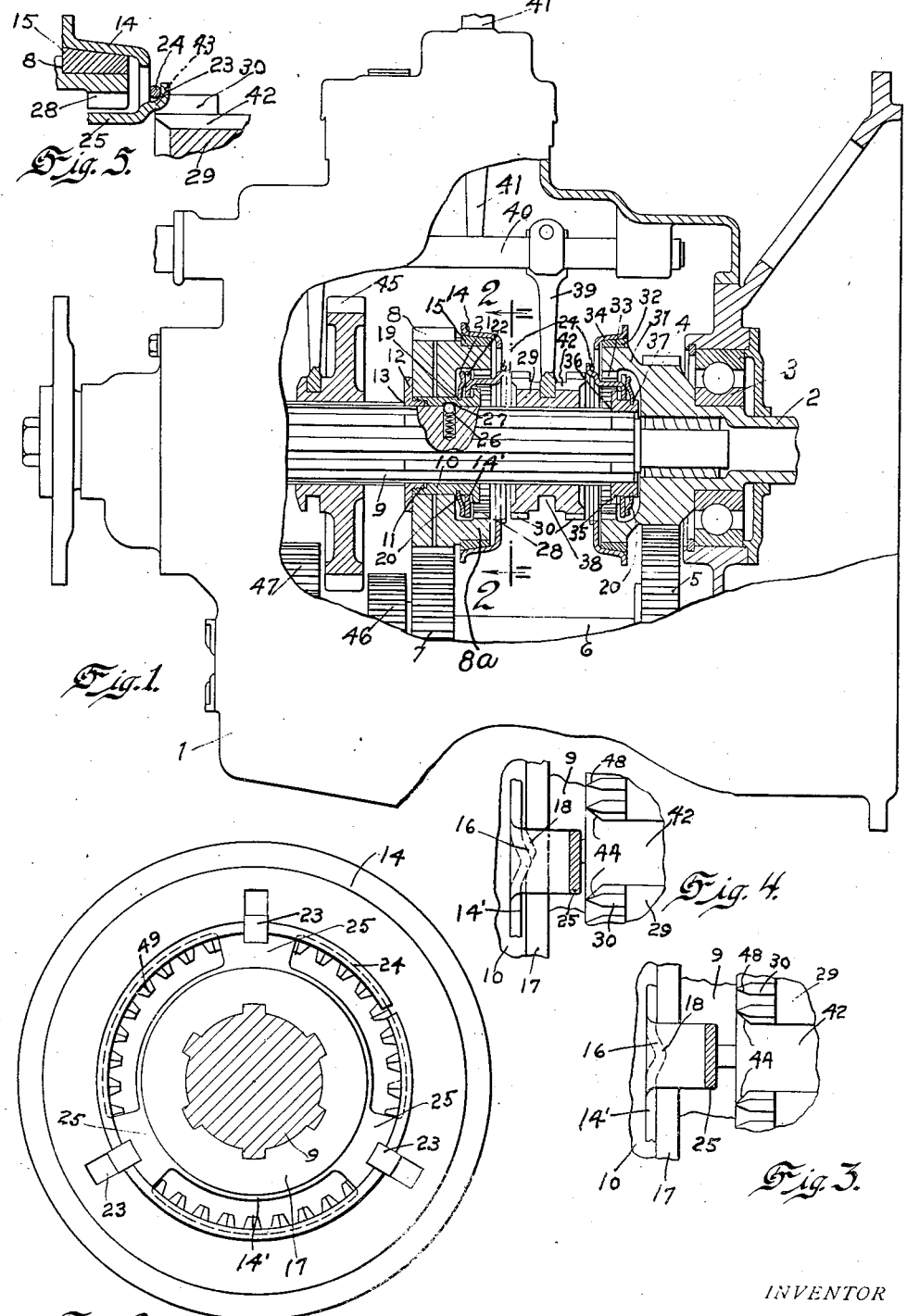
INVENTOR
Earl A. Thompson
ATTORNEY Patented Dec. 7, 1937

2,101,827

UNITED STATES PATENT OFFICE 2,101,827

SYNCHRONIZED POWER TRANSMISSION MECHANISM

Earl A. Thompson, Detroit, Mich., assignor to General Motors Corporation, Detroit, Mich., a corporation of Delaware Application August 27, 1928, Serial No. 302,228

11 Claims. (Cl. 74—339)

The invention herein claimed relates to change speed transmission mechanism comprising two or more axially aligned power transmission members respectively provided with toothed coupling elements adapted to be intermeshed, whereby one member may be positively driven from the other, and also provided respectively with frictionally engageable elements adapted to be coupled in order to bring the power transmitting elements to substantially equal speeds prior to intermeshing the positive coupling elements.

The primary object of the invention is to utilize force developed by rotating parts of the transmission mechanism to augment the pressure of one frictionally engageable element upon its companion in order to synchronize the speeds of the toothed coupling elements before intermeshing them and to insure disengagement of the friction elements and cessation of action of said force upon them when synchronizing has been effected in order that rotative self-adjustment of the teeth of the positive coupling elements, one to the other, may not be prevented by the friction lock between the friction elements.

Additional objects and advantages of the invention will be made apparent in the detailed description to follow and in the accompanying illustration of one particular embodiment of the invention.

Figure 1 is a longitudinal vertical section through the transmission, with parts shown in elevation.

Figure 2 is a transverse vertical section taken on the line 2—2 of Figure 1, showing a synchronizing drum constituting one of the synchronizing clutch elements in elevation. This view is slightly enlarged in order to more clearly show the parts.

Figure 3 is a fragmentary plan view of a slidable positive coupling element and portions of a synchronizing drum, relatively rotatable cam elements appearing in their normal position, and one spoke of the synchronizing drum being shown in section.

Figure 4 is a fragmentary plan view similar to Figure 3, showing the relatively movable cam elements moved out of their normal position as they would be when the synchronizing clutch is engaged.

Figure 5 is an enlarged fragmentary section through the synchronizing drum and slidable positive coupling element showing the relative position of the parts when in neutral position.

My invention will now be described in detail with particular reference to the embodiment illustrated in the accompanying drawing showing a now preferred embodiment thereof.

In the transmission casing 1 is mounted the shaft 2. This shaft transmits the drive from the motor in the usual manner through a friction clutch, not shown. The shaft 2 is supported by the bearing 3 and has formed on its inner end the gear 4. In continuous driving engagement with the gear 4 is the gear 5 on the countershaft 6, which also carries the gear 7. In continuous driving relation with the gear 7 is the gear 8, the gear 8 being supported by the main splined drive shaft 9, which is supported within the transmission casing 1 in a conventional manner. The gear 8 is mounted on a bushing 10, on which it is normally free to revolve. The rear end of this bushing 10 is interiorly threaded as at 11, and screwed into this threaded portion is the flanged nut 12. Both the bushing 10 and the nut 12 are splined to fit the splined shaft 9. For yieldingly securing the bushing 10 in position a spring-pressed ball 26, or similar detent, is carried in a hole drilled into the spline shaft 9 and engages in a recess 27 formed interiorly of the bushing 10. A shoulder 13 is formed on the splined shaft 9 to limit the rearward travel of the nut 12 and bushing 10.

The drum 14, which in the illustrated embodiment is designed to be formed of pressed steel, has its outer periphery made in a conical form and constitutes one of the synchronizing friction clutch elements. The other co-acting friction clutch element is shown as the conical bushing or sleeve 15, which is secured to the annular forward projection 8a of the gear 8 in any suitable manner to revolve therewith. Internal teeth 28 are formed in the annular forward projection 8a for a purpose that will be later revealed. Thus projection 8a with teeth 28 forms one element of a positive female clutch part. The hub 14' of the drum 14, fits over the bushing 10, said hub being formed as shown in Figures 3 and 4, with preferably two or more cam elements as at 16. Formed on the flange 17 of the bushing 10 are co-acting cam elements as at 18, which mate with the cam elements 16 formed on the hub 14' of the drum 14. Thus the cooperating cams 16 and 18 constitute an automatic means responsive to differential rotation of the parts to be synchronized for forcing the friction elements into closer contact once they have been lightly engaged by the operator. The hub 14' is composed of a central ring-like part on which the cam elements 16 are formed, and it is connected by spokes 25 to the ring-like periphery or rim of the drum. The hub 14' is disposed well within the cavity formed by the body of the gear 8 and the annular projection 8a thereon. The spokes 25, it will be observed, extend slightly radially outward from the hub 14' and then forward approximately parallel with the axis of the drum to the face of the drum and then turn radially outward to join the material of the rim portion as shown in Figs. 1 and 5. There is thus in the drum 14 an annular projection which partly encompasses or surrounds the annular projection 8a.

Fitting into an annular groove 19 formed in the bushing 10 is a spring in the form of a split spring snap ring 20, having a plurality of ears or spring portions 21, which normally press against corresponding ears 22 formed up flush with the hub 14' of the drum 14. It will be evident from the height of these ears that they must be narrow enough to pass in between the internal teeth 28 to allow assembly of the gear and drum. The purpose of this spring will be later brought out.

The drum 14 has formed in its outer face ears forming a channel, as at 23, Figures 1, 2 and 5, adapted to receive and support a snap ring 24, for a purpose which will later appear.

An annular rearward projecting portion 31 is formed on the gear 4 and has secured thereto, to turn therewith, a conical bushing or sleeve 32 similar to the conical bushing 15 mounted on the annular projection 8a of gear 8. The projection 31 has internal teeth 33 formed therein thus constituting with said projection a female positive clutch element. A friction drum 34, having a conical surface to co-act with the bushing 32, is mounted on a bushing 35, which is splined to fit on the spline shaft 9 to turn therewith. The spline shaft 9 has a shoulder as at 36 to limit the rearward movement of the bushing 35.

Inasmuch as the drum 34 is identical with the drum 14 a detailed description thereof is deemed unnecessary. It is thought sufficient to say that the bushing 35 has cam elements formed therein identical with the cam elements 18 described in connection with bushing 10, which cam elements co-act with corresponding cam elements 16 on the drum 14 or 34. A spring snap ring 20 is carried in an annular groove 37 formed in the bushing 35 for the purpose of pressing upon the drum 34 in the same manner as spring 20 presses on drum 14 as described. The use of different reference numerals on these identically constructed drums is to facilitate the description of operation which will follow later.

A male coupling element 29 is splined and mounted on the spline shaft 9 for sliding movement and has formed on its outer periphery teeth 30 adapted to engage with the internal clutch teeth 28 rigid with the gear 8, or the internal clutch teeth 33 rigid with the gear 4. An annular groove 38 is formed in the coupling element 29 in which is received the shifter fork 39 for the purpose of enabling the shift of the coupling element longitudinally on the spline shaft 9. The shifter fork 39 is secured to the shifter rod 40, which is adapted to be shifted longitudinally by means of the control lever 41 in a conventional manner. The coupling element 29 also has longitudinally extending recesses formed in its outer periphery as at 42 separating the teeth 30 into a plurality of groups, these recesses being equal in number to the spokes 25 formed in the drums 14 and 34. These recesses 42 are slightly wider than the spokes 25 of the drums 14 and 34 and provide clearance for the spokes of the drums when the coupling element 29 is shifted so that its external teeth 30 mesh with the internal teeth 28 or 33. The ends of the teeth 30 of the coupling element 29 are beveled as at 43, Figure 5, so that when the coupling element is shifted these beveled ends of the teeth will engage the snap ring 24, carried by one or the other of the drums 14 or 34 for the purpose of moving the drum longitudinally to engage the conical friction surfaces.

The snap ring 24 is made of such proportions that it will exert a substantial pressure against the drum before it will be expanded by the pressure of the beveled ends of the teeth 30 and allow the teeth of coupling element 29 to shift into engagement with the internal teeth 28 or 33. The ends of the teeth 30 and the sides of the recesses 42 of the coupling element 29 are beveled as at 44, shown in Figures 3 and 4.

Referring to Figure 3 it will be perceived that when the drum is in its normal position with its cam elements 16 fitting centrally between the cam elements 18, formed in either of the bushings 10 or 35, the spoke portions 25 of the drum will be in substantial alignment with the corresponding recesses 42 of the coupling element 29.

Referring now to Figure 4, which shows the drum out of its normal position, that is, when the cam elements 16 and 18 are rotated relatively to each other, it will be perceived that when the coupling member 29 is shifted the inclined or chamfered sides 44 of the recesses 42 and adjacent teeth will engage one side edge or the other of the spokes 25 adjacent their junction with the rim of the drum, depending upon which direction the drum cam elements are moved out of their normal position, and this engagement, as the coupling element 29 is shifted, will rotate the drum back to its normal position thus releasing and disabling the automatically acting cams when synchronous rotation has been effected so that the spring ring 20 can act on the drum to disengage it from the conical bushing 15 or 32. In the event that the conical friction surfaces of the drum should tend to stick on the conical bushing and not freely release, the teeth 30 of the coupling 29 striking the internal teeth 28 or 33 as it is shifted into engagement will jar the gears sufficiently in the direction necessary for disengagement of the conical friction surfaces to produce their disengagement, and thus allow the gears to become free from the friction drums at the instant of engaging contact so that they may rotate sufficiently to permit easy intermeshing. While the power transmitting members to be coupled are rotating at different speeds the coupling element 29 cannot be forced into mesh with the companion toothed coupling element without the exercise of a force greater than the tangential force due to the difference in rotary speeds of the power transmitting members because the corners of the spokes of the friction drum are in the path of movement of the inclines 44 on coupling element 29. When the tangential force disappears with the achievement of synchronous rotation of the two power transmitting members the coupling element can be readily pushed by the operation of the shift lever into mesh with its companion as the friction drum, or the friction drum and the then idle gears to which it is frictionally coupled, may be readily rotated by the tangential component of the force exerted by the inclined surfaces 44 against the rounded corners of the spokes 25 when coupling element 29 is moved axially, so as to aline the spokes with the recesses 42 and permit intermeshing of the positive coupling elements.

When the coupling element 29 is shifted to the right, Figure 1, so that its teeth 30 intermesh with the internal teeth 33, the shaft 2 is coupled to the spine shaft 9 for direct drive, and when the coupling element 29 is shifted to the left of Figure 1 so that its teeth 30 intermesh with the internal teeth 28 of the gear 8, the drive is through what is commonly known as "intermediate". The "low" and reverse drives are obtained by shifting the gear 45 into mesh with the gear 46 to obtain what is commonly known as "low gear" and the gear 45 when shifted in the opposite direction into mesh with the gear 47 obtains reversal of the drive. Inasmuch as these last mentioned parts are of conventional construction it is deemed unnecessary to describe them in detail, as they form no part of this invention and are merely shown to illustrate the complete set of gearing.

It will be seen by reference to Figure 1 of the drawing that the "intermediate" driven gear 8 is assembled as a unit with its synchronizing friction drum 14 on the bushing 10 and then the nut 12 is screwed into the bushing 10 until sufficient end play is obtained between the conical bushing 15 and the synchronizing drum 14 to allow the proper running clearance between their conical surfaces, and then the splines of the bushing 10 and nut 12 are lined up and the whole unit slipped onto the splined shaft up against the shoulder 13, where the locking ball 26 will retain it against movement away from this shoulder. To facilitate assembly it will be found desirable to retain the spring pressed ball 26 in the drilled hole in the spline shaft 9 by slightly peening over the edges of the hole so that when the gear unit is disassembled the ball will not be forced out by its spring.

It will be understood from the foregoing description and having reference to Figures 1, 3 and 4 of the drawing that the drum 14 is caused to rotate with the bushing 10 through the cam elements 16 and 18, which constitute a lost motion driving connection between the drum and the spline shaft the engaging of the conical surfaces of the drum with the conical bushing 15 preventing the cam elements 16, carried by the drum, from rotating out of engagement with the cam elements 18, carried by the bushing.

Another point I desire to emphasize, which I have found to be very important in the practical operation of this type of gearing, regardless of the specific form of synchronizing means used, is the manner of chamfering or pointing the ends of the teeth 30 of the coupling member 29 and the ends of the internal teeth 28 and 33, with which the teeth of the coupling element 29 intermesh. It will be seen by referring to Figures 2, 3 and 4 that the ends of the teeth 30 of coupling element 29 are beveled on their sides as at 48 to form comparatively sharp points on the ends thereof, the ends of the internal teeth being similarly pointed as at 49 (Fig. 2) so that the teeth 30 will find their way into easy engagement with the mating internal teeth 28 or 33. This construction is practical and desirable because the teeth are synchronized. In the old forms of gearing such design would not be good practice as the ends of the teeth would soon be worn away. Another important feature is that the teeth 30 of the coupling element 29 and cooperating internal teeth 28 and 33 are made of substantially finer pitch than teeth ordinarily used in the main gearing. For example, the teeth ordinarily used in the main gearing of automobile transmissions are usually made either six or seven diametrical pitch, or of some modified form of tooth corresponding to these pitches, whereas I have found that teeth for the coupling connection, corresponding substantially in size to twelve or fourteen diametrical pitch, give much superior results in obtaining smoother and easier engagement than when teeth of larger pitch are used.

The operation of the device is as follows: Suppose, for example, that the vehicle is moving and it is desired to shift into "intermediate" gear, the control lever 41 will be moved so that the coupling element 29 will be moved to the left as viewed in Figure 1. The first pressure applied to said coupling for effecting this movement will cause the beveled ends 43 of the teeth 30 to bear against the snap ring 24 carried by the drum 14. This pressure will move the drum 14 into frictional engagement with the conical bushing 15 on the gear 8, which will then begin to develop a certain amount of torque, tending to bring the gear 8 to the speed of the spline shaft 9, which is being rotated by the movement of the vehicle. It will, however, be remembered that the drive for the drum 14 comes through the cam connection with the bushing 10, so that as the initial torque begins to build up on the friction surface of the drum the reaction between the cam surfaces 16 and 18 will force the friction surface of the drum tighter into engagement with the companion friction surface on gear 8, which in turn will cause a greater torque reaction against the cam elements 16 and 18 and thus quickly build up the pressure of the drum 14 against the conical bushing 15 until the two parts are frictionally locked together; thus the internal teeth 28 of the gear 8 are brought to the same rotative speed as the external teeth 30 of the coupling element 29. This synchronization will be brought about in a fraction of a second. As further pressure is applied from the control lever to shift the coupling element 29 the snap ring 24 will be expanded by the beveled ends 43 of the teeth of the coupling element, whereupon the coupling element can move further until the beveled sides 44 of the recesses 42 and adjacent teeth engage the rounded corners of the spokes 25 of the drum. As long as the two power transmitting members to be coupled are rotating asynchronously movement of the coupling member into mesh with its companion is opposed because the edges of the spokes are then in the line of axial movement of the beveled surfaces 44. In order that the toothed couplings may intermesh the coupling element 29 must push aside the friction clutch drum. It may do this easily when the two power transmission members to be coupled have attained equal speeds since then the tangential force which maintained the rounded corners of the arms 25 in the path of movement of the surfaces 44 of the coupling element 29 has disappeared.

In shifting from "intermediate" to direct drive or "high" the control lever is moved in the opposite direction which disengages the coupling 29 from the gear 8 and through a similar set of operations as just described for "intermediate" gear the drum 34 will be caused to act through the cam elements 16 and 18 to frictionally engage the conical bushing 32 and thereby compel the shaft 2 to rotate in unison with the spline shaft 9 so that the teeth 30 of the coupling 29 may be easily and smoothly meshed with the internal teeth 33, which are connected to the shaft 2, thus establishing a direct drive.

I claim:

1. Power transmission mechanism comprising drive and driven members, a shiftable element operatively associated with said members for establishing a driving relation therebetween, synchronizing means including a pair of coacting friction elements for establishing the desired speed relation between said members before said driving relation is established, a driving connection between one of said friction elements and one of the members, said driving connection constructed and arranged to allow restricted relative angular and axial movement and to convert relative angular movement into an axial movement of the friction element, means associated with the shiftable element causing positive release of the friction elements at the proper time, and means for effecting operation of the synchronizing means and shifting the shiftable element.

2. In a power transmission, a pair of rotary power-transmitting members, means associated with said members adapted to establish a drive therebetween, manually operable means for connecting and disconnecting said drive and synchronizing means for establishing the desired speed relation between the members before they are placed in driving relation, said synchronizing means including co-acting friction elements respectively in driving engagement with the respective members, means associated with one of the friction elements for effecting initial contact of the friction elements from the manually operable means, means for applying power from the rotation of one of the members to one of the friction elements to produce final effective engagement of the friction elements, and means deriving its force from said manually operable means for connecting said drive to positively restore the friction elements to normal position before the drive is established.

3. In power transmission mechanism the combination of two members capable of relative rotation; means for driving one member from the other comprising toothed coupling elements in driving connection respectively with the respective members; a friction clutch element in driving connection with each of said members for coupling said members prior to effecting engagement of the toothed elements, one of the friction clutch elements being mounted to be capable of limited angular and axial movement on the member with which it has a driving connection; operator controlled means for causing engagement of the friction clutch elements, and thereafter of the toothed clutch elements; means responsive to relative angular movement of said angularly movable friction clutch element and the member with which it has a driving connection for augmenting the intensity of the engaging pressure between said friction clutch elements, and means responsive to the clutch engaging movement of the operator controlled means for relieving the pressure exerted by said augmenting means.

4. In power transmitting mechanism the combination of two members capable of relative rotation; a toothed coupling element in driving connection with each member, one of said toothed coupling elements being slidable into and out of engagement with the other; a friction clutch element in driving connection with each member, one of said friction clutch elements having a limited angular and axial movement with respect to the member with which it is in driving connection; cam elements rotative with the member by which the friction clutch element having the limited angular and axial movement is driven, cooperating cam elements on said last-named friction clutch element, operator controlled means for effecting engagement of said friction clutch elements and said toothed coupling elements, and cooperating means on said slidable toothed element and said cam carrying friction clutch element operative to displace and disengage said cams during the engaging movement of the slidable toothed coupling element and release the friction lock.

5. A combination as defined in claim 4 in which the slidable coupling element is provided with inclined surfaces on its advancing end, and the cam carrying friction clutch element is equipped with spaced members in the path of movement of said inclined surfaces when the cams in said friction clutch element are in tight engagement with the cams rotative with the member with which the said friction clutch element is in driving engagement.

6. A combination as defined in claim 4 in which the slidable coupling element is provided with longitudinal grooves and inclined surfaces on the advancing edges of the grooves, and the cam carrying friction clutch element has openings spaced by spoke-like members, the grooves being of a width but slightly greater than that of the spoke-like members, one edge or the other of said spoke-like members being in the path of said inclined surfaces on the slidable coupling element when the cams are tightly engaged.

7. A combination as defined in claim 4 in which the slidable coupling element is provided with longitudinal grooves and inclined surfaces on the advancing edges of the grooves, and the cam carrying friction clutch element consists of an outer rim having a friction surface, an inner ring-like part carrying the cams, and connecting spoke-like members curved longitudinally and adapted to enter the grooves in the slidable coupling element, one edge or the other of said spoke-like members being in the path of said inclined surfaces on the slidable coupling element when the cams are tightly engaged, said inclined surfaces being adapted to disengage the cams when synchronization has been effected and move the spoke-like parts into line with the grooves in the slidable coupling element to release the friction lock and permit engagement of the toothed coupling elements.

8. In power transmitting mechanism the combination of a pair of axially alined rotary members one of which is in driving connection with one element of a toothed clutch and also with one element of a friction clutch and the other of which is in driving connection with a toothed and a friction clutch element arranged to engage with the companion elements aforesaid; cooperating camming means on one of said members and the friction clutch element in driving connection therewith for establishing said driving connection; means for moving one of said toothed elements axially toward its companion, and cooperating means on said toothed element and cam-driven friction clutch element constructed and arranged to release said cam engagement and prevent engagement of the toothed elements until said cam engagement is released.

9. In power transmission mechanism, two rotary members, a composite clutch for releasably coupling them so that one may drive the other, said composite clutch comprising two toothed elements, one of which is movable into or out of engagement with its companion, and two engageable and disengageable friction elements adapted to be engaged prior to the attempted engagement of the toothed clutch elements in order to first synchronize the speeds of said members; cooperating camming means constituting a driving connection between one of said members and one of said friction elements whereby to transmit torque between the member and friction element and to convert a portion of the torque into an axial force tending to produce synchronization, and cooperating means on said movable toothed element and on said latter named friction element for applying a tangentially directed force thereto by the engaging movement of said toothed element, in opposition to said torque.

10. In a synchronizing power transmission mechanism, a spline shaft, a bushing flanged at each end splined thereto, and means for releasably locking said bushing against axial movement on the shaft, a member equipped with a friction clutch surface and positive clutch teeth, rotatable on said bushing between the flanges, and an engageable and disengageable friction clutch element surrounding said bushing and held thereon between said member and one of the flanges.

11. A combination as defined in claim 10 wherein the spline shaft is provided with a fixed abutment engaged by one end of the bushing, and a resilient latching means is disposed between the shaft and the bushing.

EARL A. THOMPSON.